(12) United States Patent
Ninomiya

(10) Patent No.: US 9,639,840 B2
(45) Date of Patent: May 2, 2017

(54) INFORMATION PROCESSING DEVICE AND INFORMATION PROCESSING METHOD

(71) Applicant: PANASONIC INTELLECTUAL PROPERTY MANAGEMENT CO., LTD., Osaka (JP)

(72) Inventor: Takeshi Ninomiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 120 days.

(21) Appl. No.: 14/638,024

(22) Filed: Mar. 4, 2015

(65) Prior Publication Data
US 2015/0254667 A1   Sep. 10, 2015

(30) Foreign Application Priority Data

Mar. 10, 2014   (JP) .................................. 2014-046915

(51) Int. Cl.
*G06F 21/00*   (2013.01)
*G06Q 20/40*   (2012.01)
(Continued)

(52) U.S. Cl.
CPC ......... *G06Q 20/409* (2013.01); *G06F 3/0412* (2013.01); *G06Q 20/20* (2013.01);
(Continued)

(58) Field of Classification Search
USPC ......................................................... 705/50
See application file for complete search history.

(56) References Cited

U.S. PATENT DOCUMENTS

| | | | |
|---|---|---|---|
| 6,209,104 B1 * | 3/2001 | Jalili ........................ | G06F 21/36 340/5.8 |
| 7,992,007 B2 * | 8/2011 | Lazzaro ............. | G06Q 30/0641 713/183 |

(Continued)

FOREIGN PATENT DOCUMENTS

| | | |
|---|---|---|
| JP | 9-54862 | 2/1997 |
| JP | 2000-20468 | 1/2000 |

(Continued)

OTHER PUBLICATIONS

U.S. Appl. No. 14/565,986 to Manabu Matsumoto et al., filed Dec. 10, 2014.

*Primary Examiner* — Zeshan Qayyum
(74) *Attorney, Agent, or Firm* — Greenblum & Bernstein, P.L.C.

(57) ABSTRACT

A payment settlement terminal device includes a housing that has a first surface having an operation display surface, a second surface at the opposite side of the operation display surface, and a step portion formed on one end side of the second surface in parallel with the end edge of one end side. A length of the housing in thickness direction in the one end side adjacent to the step portion is greater than a length of the housing in thickness direction in the other end side of the step portion, and a non-secure area not having tamper-resistance at the one end side of the housing and a secure area having the tamper-resistance at the other end side of the housing. A payment settlement terminal device is provided, in which the security can be ensured and the user can easily perform the payment settlement.

17 Claims, 9 Drawing Sheets

(51) Int. Cl.
  *G06F 3/041*  (2006.01)
  *G06Q 20/24*  (2012.01)
  *G06Q 20/20*  (2012.01)
  *G07F 7/08*  (2006.01)

(52) U.S. Cl.
  CPC ........... *G06Q 20/206* (2013.01); *G06Q 20/24* (2013.01); *G07F 7/088* (2013.01)

(56) References Cited

U.S. PATENT DOCUMENTS

| | | | |
|---|---|---|---|
| 2004/0108994 A1* | 6/2004 | Kato | G06F 3/0236 345/171 |
| 2010/0145854 A1 | 6/2010 | Messerges et al. | |
| 2014/0152575 A1 | 6/2014 | Joe et al. | |

FOREIGN PATENT DOCUMENTS

| | | |
|---|---|---|
| JP | 2003-196006 | 7/2003 |
| JP | 2007-164423 | 6/2007 |
| JP | 2011-90617 | 5/2011 |
| JP | 2012-185565 | 9/2012 |
| JP | 2012-191445 | 10/2012 |
| WO | 2013/024526 | 2/2013 |

\* cited by examiner

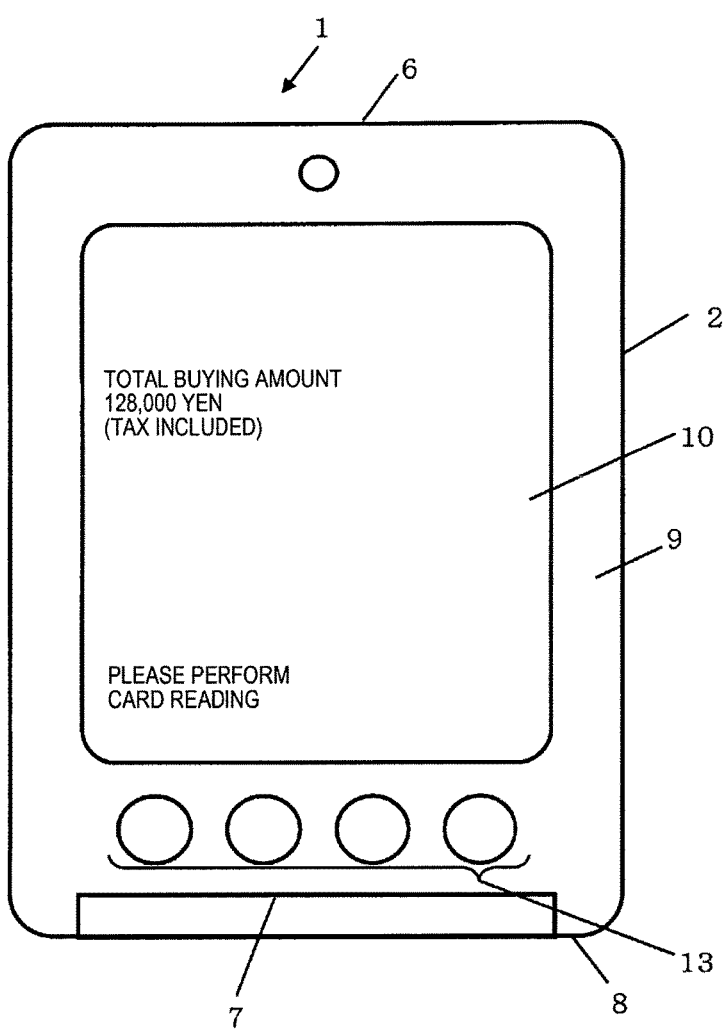
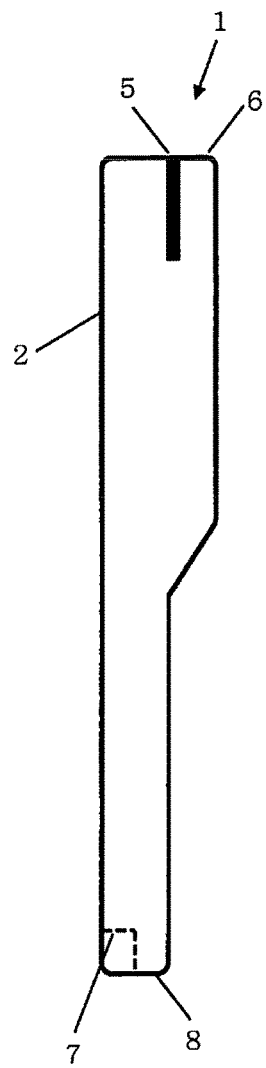

INFORMATION PROCESSING DEVICE AND INFORMATION PROCESSING METHOD

BACKGROUND OF THE INVENTION

1. Field of the Invention

The present invention relates to an information processing device and information processing method used for performing, for example, a payment settlement or a commercial transaction.

2. Description of the Related Art

In a credit transaction using a credit card, security of the transaction can be ensured by checking (identification) whether or not a person who performs the transaction and an owner of the credit card used in the transaction are the same person. The identification is performed in such a manner that, for example, a customer signs (signature) on a transaction slip on which a transaction content is printed and output at the time of transaction processing, and then, a sales clerk compares the signature and a signature signed on the credit card by a visual checking.

In order to ensure the security in the transaction, for example, a mobile device ensuring "tamper-resistance" disclosed in US Patent Unexamined Publication No. 2010/0145854, has been proposed. The "tamper-resistance" is resistance to an attack that attempts to steal information from the terminal. By preparing the "tamper-resistance", the information of the customer is protected and the transaction is performed safely. In the mobile device disclosed in US Patent Unexamined Publication No. 2010/0145854, a secure portion (portion having the tamper-resistance) relating to authentication card information used in the payment settlement is separated from the non-secure portion (generic portion).

However, in the mobile device described above, the ensuring of the security in authentication processing such as the identification is not sufficient.

SUMMARY OF THE INVENTION

The present invention is to provide an information processing device and an information processing method in which security in authentication processing can be improved and the user can safely execute the authentication processing, payment settlement processing, and the like even in a case where a mobile device has a non-secure portion.

According to an aspect of the present disclosure, an information processing device includes: a display unit that displays an input area in which authentication information which is used for authentication processing is input; a detection unit that detects an input of the authentication information in the input area; and a control unit that changes a display position of the input area with respect to the display unit for each timing of transition in which a first screen which does not include the input area is shifted to a second screen which includes the input area. The control unit causes the input area to be displayed on the changed display position with respect to the display unit, and causes a symbol display area to be displayed, in which symbols of which the number is the same as the number of inputs of the minimum unit information that configures the authentication information, makes the number of displayed symbols be the same as the increased or decreased number of inputs for each time the number of inputs of the minimum unit information increases or decreases, and changes the display position of the symbol display area with respect to the display unit.

An information processing method in the present disclosure is an information processing method in the information processing device, and the method includes: detecting an input of the authentication information in the input area in which the authentication information which is used for authentication processing is input; changing a display position of the input area in a display unit that displays the input area, for each timing of transition in which a first screen which does not include the input area is shifted to a second screen which includes the input area; causing the input area to be displayed on the changed display position with respect to the display unit; causing a symbol display area to be displayed on the display unit, in which symbols of which the number is the same as the number of inputs of the minimum unit information that configures the authentication information; and making the number of displayed symbols be the same as the increased or decreased number of inputs for each time the number of inputs of the minimum unit information increases or decreases, and changing the display position of the symbol display area with respect to the display unit.

According to the present disclosure, the security in the authentication processing can be improved and the user can safely execute the authentication processing, the payment settlement processing, and the like.

BRIEF DESCRIPTION OF DRAWINGS

FIG. 1A is a front external view illustrating an example of a payment settlement terminal device in a first embodiment;

FIG. 1B is a side external view illustrating an example of the payment settlement terminal device in the first embodiment;

DETAILED DESCRIPTION OF THE PREFERRED EMBODIMENTS

Figure 2:
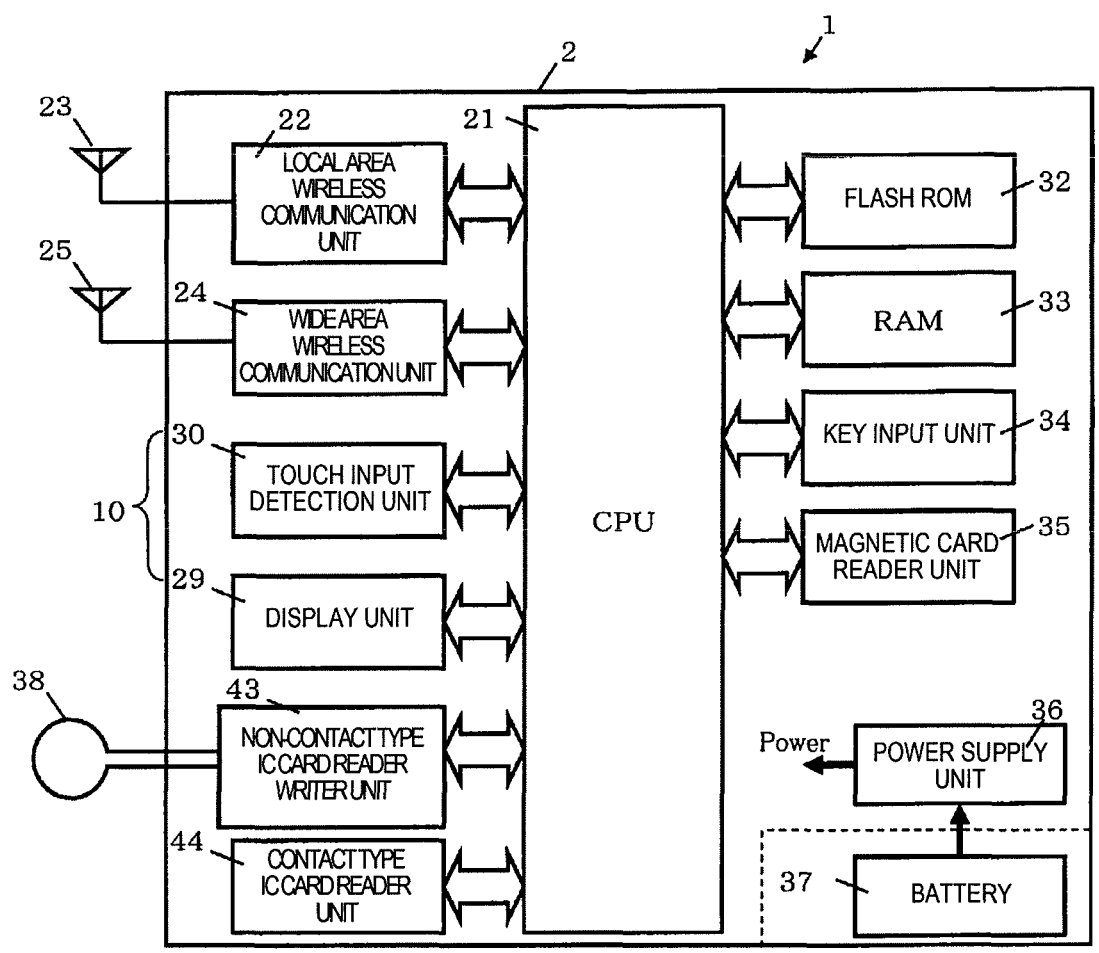
FIG. 2 is a block diagram illustrating a configuration example of the payment settlement terminal device in the first embodiment.

Hereinafter, the embodiments of the present disclosure will be described using the drawings.

History Leading to an Embodiment of the Present Invention

In a mobile device disclosed in US Patent Application Publication No. 2010/0145854, there is a possibility that security is ensured with regard to a secure portion and the security is not sufficient with regard to the non-secure portion. For example, in a case where an unauthorized application is installed or a virus infection has occurred in the non-secure portion, there is a possibility that an input area to input authentication information (for example, PIN or signature) for the identification is illegally hidden, and another unauthorized input area is displayed. In this case, a user of the mobile device may input the authentication information into the illegal input area, and thus, there is a possibility that the authentication information are taken by fishing or the like. Therefore, it is desirable that the user can safely execute the authentication processing, the payment settlement processing, and the like, even in a case where the mobile device has the non-secure portion.

Hereinafter, an information processing device, an information processing method, an information processing program, and a recording medium in which security can be improved in authentication processing will be described.

In the embodiment described below, a payment settlement terminal device is exemplified as the information processing device. Another information processing device besides the payment settlement terminal device may be used or an information processing device that performs the authentication processing using the authentication information can widely be included.

First Exemplary Embodiment

FIG. 1A is a front external view illustrating an example of payment settlement terminal device 1 in a first embodiment. FIG. 1B is a side external view illustrating an example of payment settlement terminal device 1 in the first embodiment.

Payment settlement terminal device 1 is a portable type and is configured to include non-secure information processing unit 2. "Non-secure" means that the device does not have tamper-resistance.

Payment settlement terminal device 1 includes slit 5 at upper side surface 6 of information processing unit 2. Upper side surface 6 of information processing unit 2 is a surface at an end side of the negative side in Y axis of information processing unit 2 in FIG. 1B. Slit 5 is a path in which a magnetic card is slid in order for a magnetic stripe in the magnetic card to be read. Touch panel 10 is provided on front surface 9 (surface at the negative side of Z axis) of information processing unit 2. A screen of touch panel 10 is a display screen on which various information items are displayed.

Payment settlement terminal device 1 includes insertion slot 7 for reading the contact type IC card at lower side surface 8 of information processing unit 2. In FIG. 1A and FIG. 1B, lower side surface 8 of information processing unit 2 is a surface at an end side of the positive side in Y axis of information processing unit 2.

FIG. 2 is a block diagram illustrating a configuration example of payment settlement terminal device 1.

Payment settlement terminal device 1 includes information processing unit 2. Information processing unit 2 includes central processing unit (CPU) 21, local area wireless communication unit 22, wide area wireless communication unit 24, display unit 29, touch input detection unit 30, non-contact type IC card reader writer unit 43, and contact type IC card reader unit 44. In addition, information processing unit 2 includes flash read only memory (ROM) 32, random access memory (RAM) 33, key input unit 34, magnetic card reader unit 35, and power supply unit 36.

In information processing unit 2, various configuration units are connected to the CPU 21. CPU 21 performs overall administrations of entire information processing unit 2. CPU 21 performs various controls, processing tasks, setting, judgment, determination, and checking by executing, for example, the program stored in flash ROM 32.

For example, CPU 21 changes a position of an input related area (for example, an input screen or a check screen of the authentication information) relating to the inputting of the authentication information in touch panel 10 at the predetermined timing. In addition, CPU 21 has a function of a detection unit that detects a variety of timings for changing the position of the input related area.

In addition, CPU 21 sets an operation mode (a secure mode or a non-secure mode) of payment settlement terminal device 1. The secure mode is an operation mode in which high safety is insured (for example, a mode when the authentication information is input). The non-secure mode is an operation mode in which high safety is not insured.

Local area wireless communication unit 22 is connected to local area wireless communication antenna 23, and includes a function of wireless LAN communication using (not illustrated) local area wireless communication path. Local area wireless communication unit 22 may perform communications other than the wireless LAN communication (for example, Bluetooth® communication).

Wide area wireless communication unit 24 is connected to wide area wireless communication antenna 25, and includes a function of communications via a (not illustrated) wide area wireless communication path (for example, wide area network (WAN)). The communication in the wide area wireless communication path may be performed, for example, using a wireless telephone network (a mobile telephone network such as a freedom of mobile multimedia access (FOMA), a code division multiple access (CDMA) 2000, or a long term evolution (LTE)).

Display unit 29 has a function of controlling the display of touch panel 10 (refer to FIG. 1A).

Touch input detection unit 30 has a function of detecting the touch input to touch panel 10.

Flash ROM 32 has a function of storing various data. The stored data may be the data relating to business or may be a program for controlling payment settlement terminal device 1 (for example, information processing unit 2). Therefore, flash ROM 32 is an example of a recording medium in which an information processing program is recorded.

RAM 33 is a memory used for temporarily storing processing data generated during the operation at the time of the operation processing associated with the operation of, for example, payment settlement terminal device 1 (for example, information processing unit 2).

Key input unit 34 has a function of, for example, receiving an input from input key 13 illustrated in FIG. 1A. Magnetic card reader unit 35 is arranged in slit 5 in FIG. 1B, and has a function of reading the magnetic stripe in the magnetic card.

Power supply unit 36 is mainly a power source of information processing unit 2, and receives the power supplied from battery 37 and supplies the power to each unit (for example, to CPU 21) of information processing unit 2. CPU 21 can supply or stop supplying the power source with respect to all or part of the circuits configuring information processing unit 2 by controlling power supply unit 36.

Non-contact type IC card reader writer unit 43 is electrically connected to loop antenna 38, and has a function of reading a non-contact type IC card. Contact type IC card reader unit 44 has a function of reading card information from an electrode of a contact type IC card inserted to insertion slot 7 (refer to FIG. 1A and FIG. 1B).

In payment settlement terminal device 1, for example, an information terminal (for example, a smart phone or a tablet terminal) that is widely distributed for consumers may be used as information processing unit 2. In information processing unit 2, for example, an operating system (OS) is adopted as a software platform.

Therefore, it is easy for information processing unit 2 to reuse or divert the developed assets such as application software for the payment settlement (hereinafter, referred to as "payment settlement application") and other application software used for other business (hereinafter, referred to as "business application"). In addition, the payment settlement application and the other business application are processed by information processing unit 2 having a high operation processing capability, and thus, the applications can flexibly operate without stress.

In addition, it is possible to suppress an increase in a development cost or a price of payment settlement terminal device 1 having a variety of payment settlement schemes.

Figure 3:
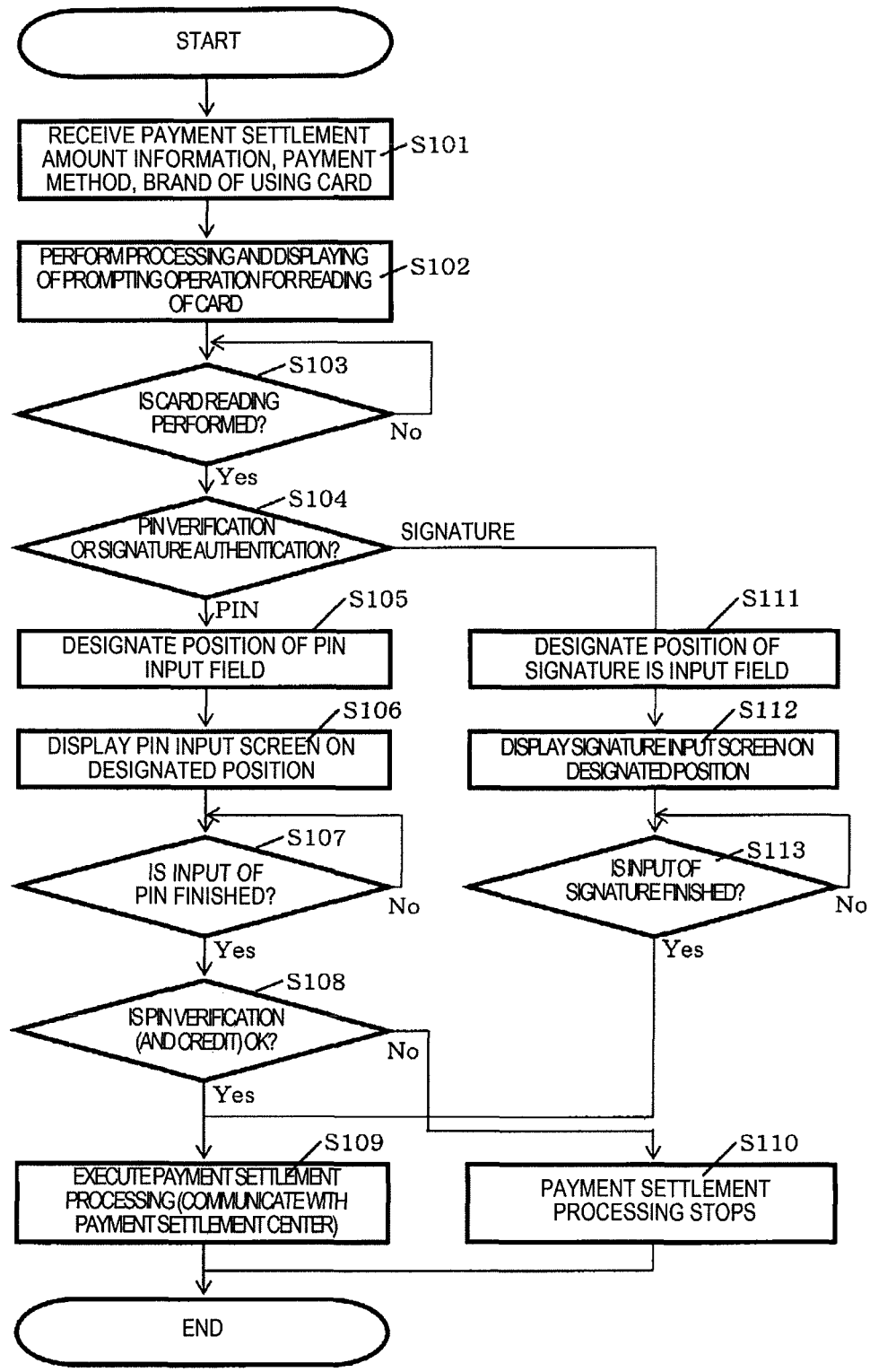
FIG. 3 is a flowchart illustrating an example of payment settlement processing flow by the payment settlement terminal device in the first embodiment.

FIG. 3 is a flowchart illustrating an example of payment settlement processing by payment settlement terminal device 1. In the present embodiment, the payment settlement processing indicates the entire payment settlement processing flow in FIG. 3 in a broad sense, and indicates processing in step S109 described below in a narrow sense. The payment settlement processing in the broad sense includes authentication processing of the user of the card (steps S104 to S108 and S111 to S113 described below).

CPU 21 causes the (not illustrated) payment settlement application installed in information processing unit 2 to be executed to start the payment settlement procedure. CPU 21 receives the information relating to the payment settlement (for example, amount information, payment information, a payment method, and a brand of the card used for the payment settlement) from the input payment settlement application or from the outside of payment settlement terminal device 1 (step S101).

In payment settlement terminal device 1, when the information relating to the payment settlement is received, CPU 21 performs the processing and displaying of prompting the operation for reading the card used for the payment settlement, as illustrated in FIG. 1A (step S102).

The processing and displaying of prompting the operation for reading the card used for the payment settlement is performed until it is confirmed by CPU 21 that the card reading is performed ("No" in step S103). If the card reading is confirmed to be performed ("Yes" in step S103). CPU 21 starts the processing of a card authentication procedure.

A card authentication method is determined based on, for example, a type of the card used for the payment settlement, information of the card, or a contract between a member shop that uses payment settlement terminal device 1 (a credit card member shop dealing with the credit card transaction) and a settlement center.

In a case where the authentication performed by the PIN (in a case of "PIN" in step S 104), CPU 21 designates a position of a PIN input field with respect to the screen of touch panel 10 (step S105). The specific method of determining the position of the PIN input field will be described below. In addition, a timing of determining the position of the PIN input field may not be in this timing.

When the position of the PIN input field is designated, CPU 21 causes a PIN input screen including the PIN input field to be displayed on the designated position in touch panel 10 (step S106), and waits for finishing of the input of the PIN by the user (customer) of the card ("No" in step S107). The PIN input screen is a screen on which the PIN can be input. The display on the PIN input screen is performed until it is confirmed that the input of the PIN is finished.

When it is confirmed that the input of the PIN is finished ("Yes" in step S107), CPU 21 waits for obtaining of the verification result of whether or not the input PIN matches the PIN registered in the card used in the payment settlement or the PIN registered in the payment settlement center ("No" in step S108).

If the verification result indicating that the two PINs match each other is obtained ("Yes" in step S108), CPU 21 executes the payment settlement processing (step S109). The communication with the payment settlement center, for example, is included in the payment settlement processing. If the verification result indicating that the two PINs do not match each other is obtained ("No" in step S108), the payment settlement processing stops (step S110).

The PIN verification is performed, for example, in the payment settlement center. CPU 21 of payment settlement terminal device 1 encrypts the PIN input in step S107, and transmits the encrypted PIN to the payment settlement center as the information of the card.

The payment settlement center decrypts the PIN received from payment settlement terminal device 1, and verifies the decrypted PIN with a PIN managed in the payment settlement center. In a case where these two PINs match each other and it is confirmed that the card having the card information received together with the PIN has no problem (for example, is not listed on a black list) in the transaction ("Yes" in step S108), the payment settlement center performs a credit (credit inquiry) with respect to payment settlement terminal device 1.

CPU 21 of payment settlement terminal device 1 receives the credit from the payment settlement center and performs the sales processing as the payment settlement processing thereafter (step S109), and then, stops the communication with the payment settlement center. CPU 21 of payment settlement terminal device 1 may perform the transmission of the sales processing data to the payment settlement center during the period from the finishing of the sales processing until the finishing of the communication with the payment settlement center, or may perform the transmission of the sales processing data to the payment settlement center later together with the sales processing data of other payment settlements as well.

In a case where the two PINs do not match each other ("No" in step S108), the payment settlement center notifies payment settlement terminal device 1 of the effect that it is difficult for the credit to be given. CPU 21 of payment settlement terminal device 1 receives the notification from the payment settlement center and does not perform the sales processing, and then, the payment settlement is stopped (step S110).

In a case where the authentication is performed by the PIN, the PIN verification may be performed between CPU 21 of payment settlement terminal device 1 and the credit card (not illustrated) read by payment settlement terminal device 1. If the verification result that the PIN input in step S107 and the PIN that is recorded in advance in a chip (not illustrated) in the credit card match with each other is obtained from the chip in the credit card ("Yes" in step S108), CPU 21 of payment settlement terminal device 1 performs the sales processing as the payment settlement processing thereafter (step S109).

CPU 21 of payment settlement terminal device 1 may perform the transmission of the sales processing data to the payment settlement center immediately after the finishing of the sales processing and before the finishing of the communication with the payment settlement center, or may perform the transmission of the sales processing data to the payment settlement center later together with the sales processing data of other payment settlements as well. In a case where the verification result in which the two PINs do not match each other is obtained (No in step S108), the sales processing by CPU 21 of payment settlement terminal device 1 stops and thus, the payment settlement stops (step S110).

In a case where the authentication is performed by the signature (the "signature" in step S104), CPU 21 designates a position of a signature input field with respect to the screen of touch panel 10 (step S111). The specific method of determining the position of the signature input field will be described below. In addition, a timing of determining the position of the signature input field may not be in this timing.

When the position of the signature input field is designated, CPU 21 causes a signature input screen including the signature input field to be displayed on the designated position in touch panel 10 (step S112), and waits for finishing of the input of the signature by the user of the card ("No" in step S113). The signature input screen is a screen on which the signature can be input. The display on the signature input screen is performed until it is confirmed that the input of the signature is finished. When it is confirmed that the input of the signature is finished ("Yes" in step S113), CPU 21 executes the payment settlement processing (step S109).

In step S104, in a case where the authentication of the credit card is performed by the signature (signature in step S104), CPU 21 of payment settlement terminal device 1 may perform the credit inquiry for the payment settlement in advance, and in a case where the notification (credit) of the success in credit inquiry is received, then, may display the screen on which the signature can be input after the sales processing is performed.

In FIG. 3, the examples of screens for performing the authentication processing are illustrated as the PIN input screen and the signature input screen. However, in a case of another authentication screen (for example, a PIN handwriting input screen), the flow is similar to that in the payment settlement processing flow in FIG. 3 as well. The PIN handwriting input screen is a screen on which the PIN can be input by handwriting using a finger of the user or a stylus pen.

As described above, payment settlement terminal device 1 includes non-secure information processing unit 2, performs the authentication processing using the authentication information, and in a case where it is normally authenticated, performs the payment settlement processing. In the authentication processing, when the authentication screen (for example, the PIN input screen or the signature input screen) is displayed on display unit 29, CPU 21 designates the position of the authentication information input field (for example, the PIN input field or the signature input field) with respect to touch panel 10. Display unit 29 displays the authentication information input field on the designated position.

Next, an example of an arrangement of the authentication information input field will be described.

The display position of the authentication information input field with respect to touch panel 10 is determined by CPU 21 in a predetermined timing described below. CPU 21 designates the display positions of the authentication information input field on the arbitrary positions where the input field does not protrude from the screen in touch panel 10 using a random number, (for example, a pseudo-random number or a hardware random number) in a plurality of timings. In this case, the possibility that the display positions of the authentication information input field in touch panel 10 are different from each other is high, but sometimes, the positions may be the same. The authentication information input field is arranged on the position designated by CPU 21 is displayed on display unit 29.

CPU 21 may designate the display positions of the authentication information input field in touch panel 10, for example, using a predetermined constant number in the plurality of timings. In this case, the display positions of the authentication information input field regularly vary in touch panel 10.

Figure 4A:
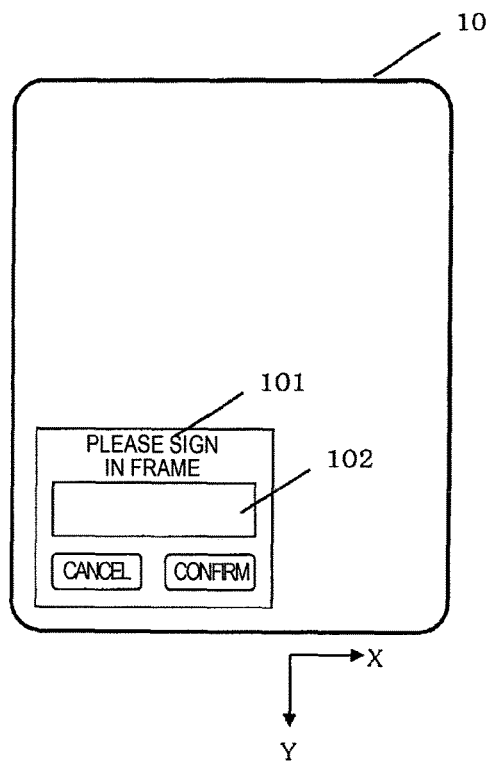
FIG. 4A is a schematic diagram illustrating an example of an arrangement of a signature input screen in a touch panel in the first embodiment.
Figure 4B:
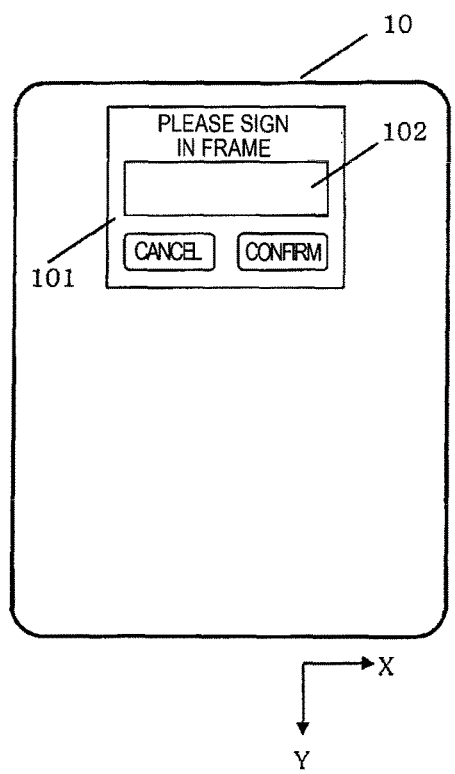
FIG. 4B is a schematic diagram illustrating an example of an arrangement of the signature input screen in the touch panel in the first embodiment.
Figure 4C:
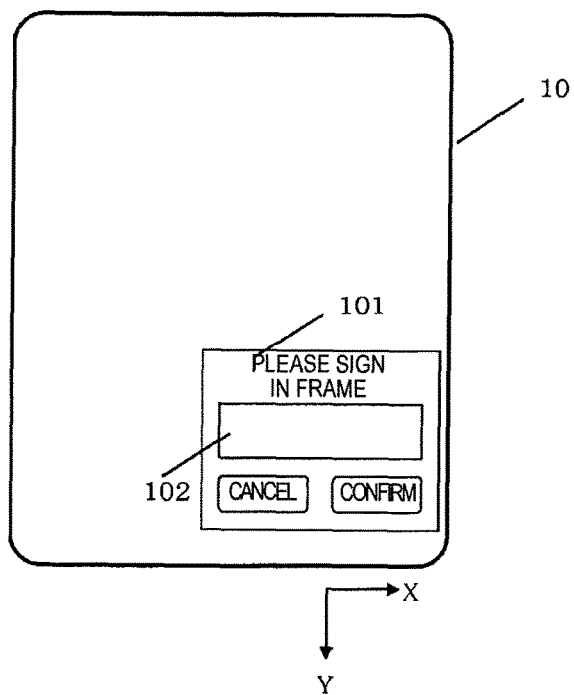
FIG. 4C is a schematic diagram illustrating an example of an arrangement of the signature input screen in the touch panel in the first embodiment.

FIG. 4A to FIG. 4C are schematic diagrams illustrating examples of the arrangement of a signature input screen 101 in touch panel 10. FIG. 4A to FIG. 4C illustrate the cases where the authentication information input fields are signature input screens 101. Signature input screen 101 includes signature input field 102 that receives the input by the finger of the user or the stylus pen, for example.

FIG. 4A illustrates the example of the arrangement of signature input screen 101 on the negative end portion in the X axis direction and the positive end portion in the Y axis direction (that is, left lower end portion) in touch panel 10. FIG. 4B illustrates the example of the arrangement of signature input screen 101 on the center portion in the X axis direction and the negative end portion in the Y axis direction (that is, center upper end portion) in touch panel 10. FIG. 4C illustrates the example of the arrangement of signature input screen 101 on the positive end portion in the X axis direction and the positive end portion in the Y axis direction (that is, right lower end portion) in touch panel 10.

CPU 21, for example, changes the display position of signature input screen 101 in touch panel 10 as illustrated in FIG. 4A→FIG. 4B→FIG. 4C for each timing of designating the display position of signature input screen 101 in touch panel 10.

Figure 5A:
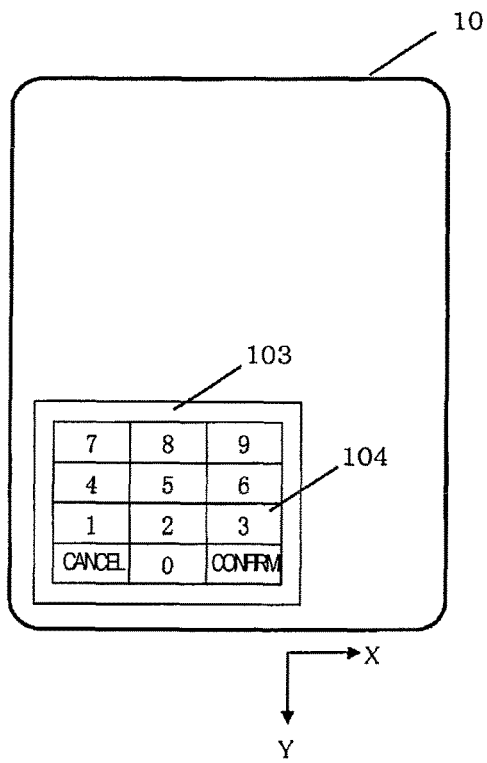
FIG. 5A is a schematic diagram illustrating an example of an arrangement of a personal identification number (PIN) in the touch panel in the first embodiment.
Figure 5B:
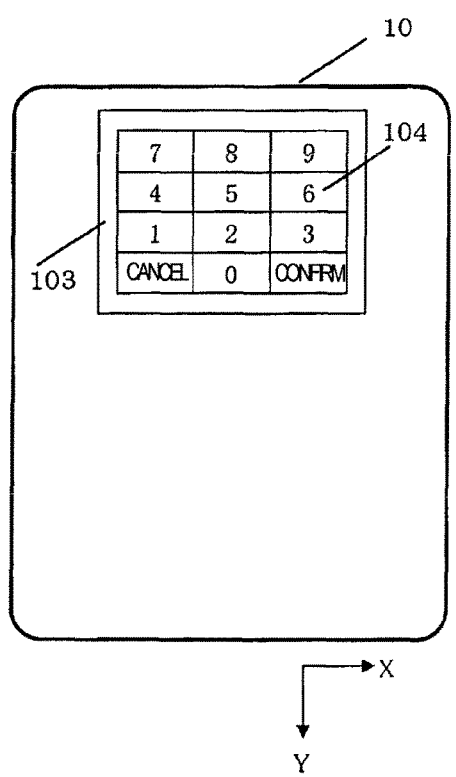
FIG. 5B is a schematic diagram illustrating an example of an arrangement of the personal identification number (PIN) in the touch panel in the first embodiment.
Figure 5C:
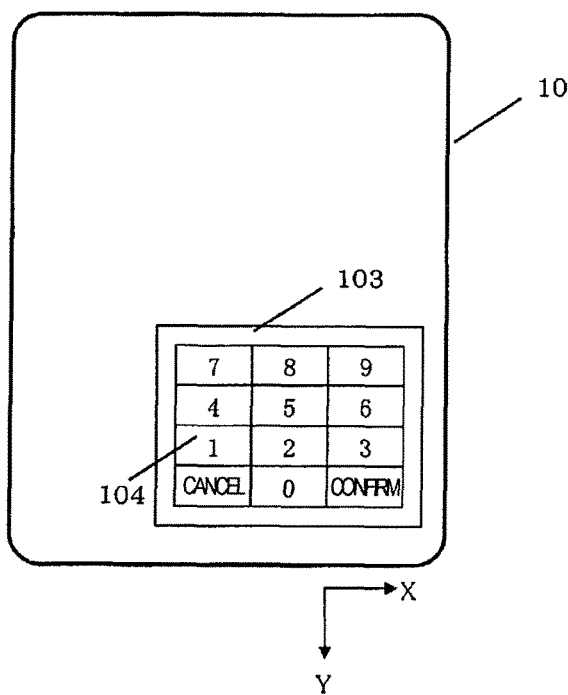
FIG. 5C is a schematic diagram illustrating an example of an arrangement of the personal identification number (PIN) in the touch panel in the first embodiment.

FIG. 5A to FIG. 5C are schematic diagrams illustrating examples of an arrangement of PIN input screen 103 in touch panel 10. FIG. 5A to FIG. 5C illustrate the cases where the authentication information input fields are PIN input screens 103. PIN input screen 103 includes PINPAD 104 as key input unit 34.

FIG. 5A illustrates the example of the arrangement of PIN input screen 103 on the negative end portion in the X axis direction and the positive end portion in the Y axis direction (that is, left lower end portion) in touch panel 10. FIG. 5B illustrates the example of the arrangement of PIN input screen 103 on the center portion in the X axis direction and the negative end portion in the Y axis direction (that is, center upper end portion) in touch panel 10. FIG. 5C illustrates the example of the arrangement of PIN input screen 103 on the positive end portion in the X axis direction and the positive end portion in the Y axis direction (that is, right lower end portion) in touch panel 10.

CPU 21, for example, changes the display position of PIN input screen 103 in touch panel 10 as illustrated in FIG. 5A→FIG. 5B→FIG. 5C for each timing of designating the display position of PIN input screen 103 in touch panel 10.

Figure 6A:
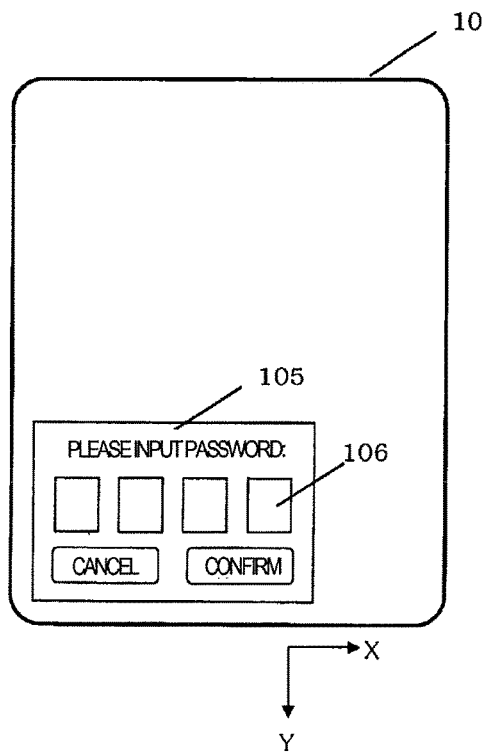
FIG. 6A is a schematic diagram illustrating an example of an arrangement of a PIN handwriting input screen in the touch panel in the first embodiment.
Figure 6B:
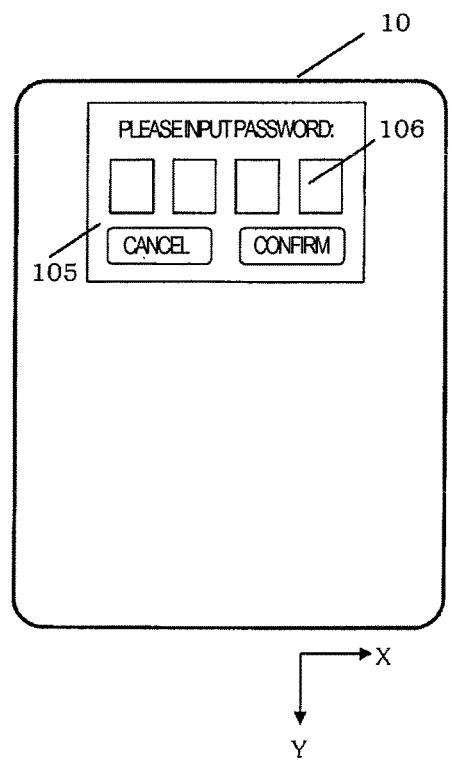
FIG. 6B is a schematic diagram illustrating an example of an arrangement of the PIN handwriting input screen in the touch panel in the first embodiment.
Figure 6C:
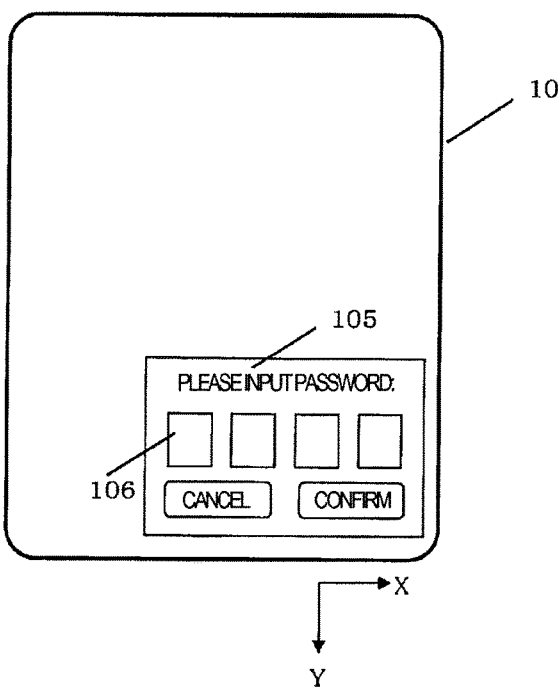
FIG. 6C is a schematic diagram illustrating an example of an arrangement of the PIN handwriting input screen in the touch panel in the first embodiment.

FIG. 6A to FIG. 6C are schematic diagrams illustrating examples of an arrangement of a PIN handwriting input screen 105 in the touch panel 10. FIG. 6A to FIG. 6C illustrate the cases where the authentication information input fields are PIN handwriting input screen 105. PIN handwriting input screen 105 includes PIN hand writing input field 106 for inputting the PIN by handwriting by, for example, the finger of the user or the stylus pen.

FIG. 6A illustrates the example of the arrangement of PIN handwriting input screen 105 on the negative end portion in the X axis direction and the positive end portion in the Y axis direction (that is, left lower end portion) in touch panel 10. FIG. 6B illustrates the example of the arrangement of PIN handwriting input screen 105 on the center portion in the X axis direction and the negative end portion in the Y axis direction (that is, center upper end portion) in touch panel 10. FIG. 6C illustrates the example of the arrangement of PIN handwriting input screen 105 on the positive end portion in the X axis direction and the positive end portion in the Y axis direction (that is, right lower end portion) in touch panel 10.

CPU 21, for example, changes the display position of PIN handwriting input screen 105 in touch panel 10 as illustrated in FIG. 6A→FIG. 6B→FIG. 6C for each timing of designating the display position of PIN handwriting input screen 105 in touch panel 10. CPU 21 may automatically adjusts the display position of PIN handwriting input screen 105 such that the input field in PIN handwriting input screen 105 does not protrude from the screen.

In addition, CPU 21 may change the display state of the handwriting field for the number (or field for the character) for each digit of handwriting input of the PIN. That is, initially, the handwriting itself of the handwritten number (or the character) is displayed, and after a certain time predetermined in advance has passed, the recognition result of the handwritten number (or the character) may be displayed.

Moreover, since the PIN is information to be handled confidentially, the display of the handwriting of the hand written number (character) or the recognition result thereof may be replaced by other predetermined information different from any of such numbers (for example. an asterisk "*") after the predetermined time has passed.

Alternatively, the replacement by the predetermined information described above may be performed after CPU 21 detects that the handwriting input to the next input field starts or detects that a "confirm" key is pressed down.

CPU 21 may designate and change the position of the authentication information input field in touch panel 10 along with changing the display state during the handwriting input of the authentication information described above.

Alternatively, CPU 21 may entirely not perform the display of the handwriting of the handwritten number (or the character) itself or the recognition result of the handwritten number (or the character), and may display another predetermined information (for example, asterisk "*") from the beginning instead of any of the above described number or the recognition result.

In order to reduce a risk of the handwriting being monitored by a malicious third party, the PIN may not necessarily be input from the first digit in order, but for example, may be input in random order, such as the fourth digit, the second digit, the first digit, and then the third digit.

Figure 7A:
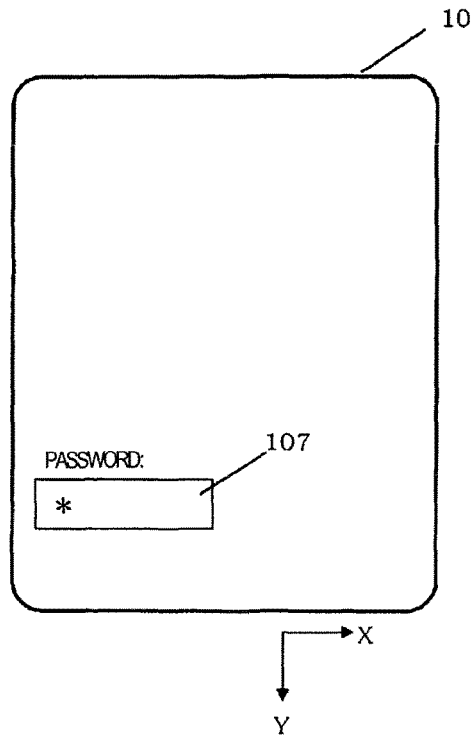
FIG. 7A is a schematic diagram illustrating an example of an arrangement of a PIN input check screen in the touch panel in the first embodiment.
Figure 7B:
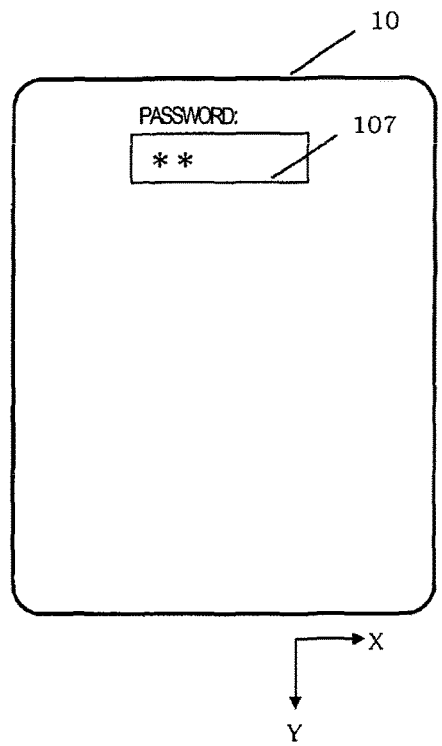
FIG. 7B is a schematic diagram illustrating an example of an arrangement of the PIN input check screen in the touch panel in the first embodiment.
Figure 7C:
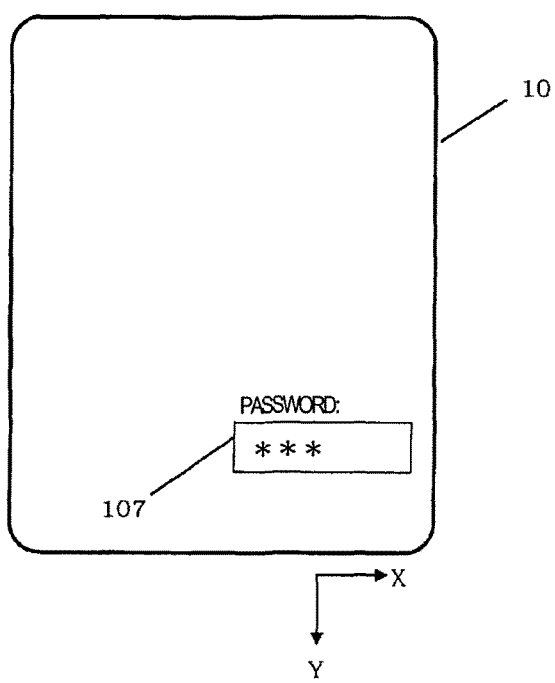
FIG. 7C is a schematic diagram illustrating an example of an arrangement of the PIN input check screen in the touch panel in the first embodiment.

FIG. 7A to FIG. 7C are schematic diagrams illustrating examples of an arrangement of the PIN input check screen 107 in touch panel 10. FIG. 7A to FIG. 7C illustrate the cases where the authentication information input field (not illustrated) is, for example, PIN input screen 103 or PIN handwriting input screen 105. PIN input check screen 107 is a screen for checking the input state of the PIN which is input using PIN input screen 103.

Since the PIN is information to be handled secret, the PIN is displayed by predetermined information (for example, the asterisk "*") that is different from the input PIN (for example, the numbers "1" to "9"). In FIG. 7A to FIG. 7C, the number of input digits of the PIN is indicated by the number of asterisks "*".

The number of input digits of the PIN may not necessarily be four digits as illustrated in FIG. 7A to FIG. 7C, but may be more than that (for example, 12 digits), or characters (for example, characters such as the alphabet) other than numbers may be used in the PIN.

CPU 21, for example, changes the display position of PIN input check screen 107 in touch panel 10 as illustrated in FIG. 7A→FIG. 7B→FIG. 7C for each timing of designating the display position of PIN input check screen 107 in touch panel 10.

FIG. 7A illustrates the example of the arrangement of PIN input check screen 107 on the negative end portion in the X axis direction and the positive end portion in the Y axis direction (that is, left lower end portion) in touch panel 10. FIG. 7B illustrates the example of the arrangement of PIN input check screen 107 on the center portion in the X axis direction and the negative end portion in the Y axis direction (that is, center upper end portion) in touch panel 10. FIG. 7C illustrates the example of the arrangement of PIN input check screen 107 on the positive end portion in the X axis direction and the positive end portion in the Y axis direction (that is, right lower end portion) in touch panel 10.

FIG. 7A illustrates the state where one digit of the PIN is input. FIG. 7B illustrates the state where two digits of the PIN are input. FIG. 7C illustrates the state where three digits of the PIN are input. That is, in FIG. 7A to FIG. 7C, CPU 21 designates and changes the arranged position of PIN input check screen 107 for each input of one digit of the PIN by touch input detection unit 30. The timing of changing the display position of PIN input check screen 107 is not limited to that described above.

For example, CPU 21 may instruct display unit 29 to alternately display PIN input screen 103 and PIN input check screen 107. Therefore, for example, the display may be shifted so as to be FIG. 5A→FIG. 7A FIG. 5B→FIG. 7B→FIG. 5C→FIG. 7C.

In addition. CPU 21 may instruct display unit 29 to simultaneously display PIN input screen 103 and PIN input check screen 107. In this case, pairs of FIG. 5A and FIG. 7A, FIG. 5B and FIG. 7B, and FIG. 5C and FIG. 7C may be displayed on touch panel 10 at the same timings. In this case also, for example, the positions of PIN input screen 103 and PIN input check screen 107 with respect to touch panel 10 are designated in each display timing and thus, the possibility that the designated positions may be different from each other is high.

Next, the timing of changing the display position of the input screen and the input check screen of the authentication information in touch panel 10 will be described.

CPU 21 may designate and change the position of the authentication information input field in touch panel 10 when the screen is shifted from a first screen in which the authentication information input field is not included (for example, the display screen in step S102 in FIG. 3) to a second screen in which the authentication information input field is included (for example, the display screen in steps S106 and S112 in FIG. 3). In this way, it is possible to improve the possibility that the display positions of the authentication information input field are different from each other for each time the authentication information input field appears in touch panel 10. Therefore, for example, since it is difficult to display an unauthorized input field on a fixed position in touch panel 10 by an unauthorized application, it is possible to prevent the authentication information from being stolen. The timing of the transition from the first screen to the second screen is detected by CPU 21.

CPU 21 may designate the position if the authentication information input field in touch panel 10 for each execution of the payment settlement processing illustrated in FIG. 3. In this way, it is possible to improve the possibility that the display positions of the authentication information input field are different from each other for each execution of the payment settlement processing.

CPU 21 may designate or change the position of the authentication information input field in touch panel 10 at the time of deleting a part or all of the information that has been already input to the authentication information input field. The deletion of a part or all of the information that has been already input, for example, includes the deletion of one digit or a plurality of digits in the PIN input and the deletion of one character or a plurality of characters in the signature input. In this way, in a case where the deletion operation of at least a part of authentication information is received from, for example, touch input detection unit 30 or key input unit 34 or in a case where the information that has been already input becomes invalid due to a timeout, it is possible to improve the possibility that the display positions of the authentication information input field are different from each other. The timing of deleting a part or all of the authentication information that has already been input is detected by CPU 21.

In a case where the input field is a PIN input field, CPU 21 may designate and change the position of the authentication information input field in touch panel 10 at the time when the display state is changed during the inputting of the authentication information.

The change of the display state during the inputting of the authentication information in a case of the PIN input occurs, for example, when the display of the number of digits for which the PIN input is received (stored) is changed. In FIG. 7A to FIG. 7C, the received (stored) number of digits of the PIN input is different from each other. CPU 21, as illustrated in FIG. 7A to FIG. 7C, may change the position of the display indicating the received number of digits of the PIN input for each change of the received (stored) number of digits of the PIN input. Incidentally, the change of the received number of digits of the PIN input includes not only the increase of the number of digits when the user of the card progresses the PIN input but also the decrease of the number of digits when the user of the card operates the cancellation key.

The timing of the screen transition (display transition) accompanied by the change of the display state described above is detected by CPU 21. In this way, it is possible to improve the possibility that the display positions of the authentication information input field are different from each other for each time the screen transition occurs.

In a case where the input field is a signature input field, CPU 21 may designate the position of the authentication information input field in touch panel 10 at the time between the inputting of the family name and inputting of the given name of the signature. In this way, in a case of performing the signature input, the possibility that the display positions of the authentication information input field are different from each other can be improved, and thus, it is possible to further improve the safety at the time of the signature input. The timing of each input described above is detected by CPU 21.

The designation and changing of the position of the authentication information input field in touch panel 10 by CPU 21 may be adopted to the designation and changing of the position of the input check screen (for example, the PIN input check screen) in touch panel 10. The input check screen is an example of an input check area.

In this case, CPU 21 functions as a generation unit that generates input check information (for example, the asterisks "*" replaced from the PIN) for checking the input, based on the authentication information of which the input is detected by touch input detection unit 30. CPU 21 may designate and change the display position of the input check screen in touch panel 10 in the timing of generating the input check information. In this way, the input check screen is not displayed on a fixed position in touch panel 10, but displayed on an arbitrary changed position. Therefore, for example, it becomes difficult for the input result to be hidden by the unauthorized application and the altered result is displayed. Therefore, it is possible to increase the security in the authentication processing.

According to payment settlement terminal device 1, since the position of input-related screen in touch panel 10 is designated or changed in a plurality of timings, the input-related screen is not fixed in a predetermined position. Therefore, for example, since it is difficult for the input-related screen to be hidden from the screen due to an unauthorized application, the security in authentication processing can be improved.

Since it is known in advance that the position of the input-related screen is changed, it is possible to suppress an intention of an illegal action against the input-related screen by a malicious operator.

Moreover, since the position of input-related screen in touch panel 10 is designated or changed in a plurality of timings, it is easy to recognize that the user of payment settlement terminal device 1 is in a secure mode state, and thus, the user's attention can be attracted. Therefore, it is possible for the user to reduce the mistakes and improve the safety in authentication processing.

Second Exemplary Embodiment

In the first embodiment, the direction of the payment settlement terminal device is not taken into consideration. In a second embodiment, the direction of the authentication information input field is determined considering the direction of the payment settlement terminal device with respect to the direction of gravity.

Figure 8:
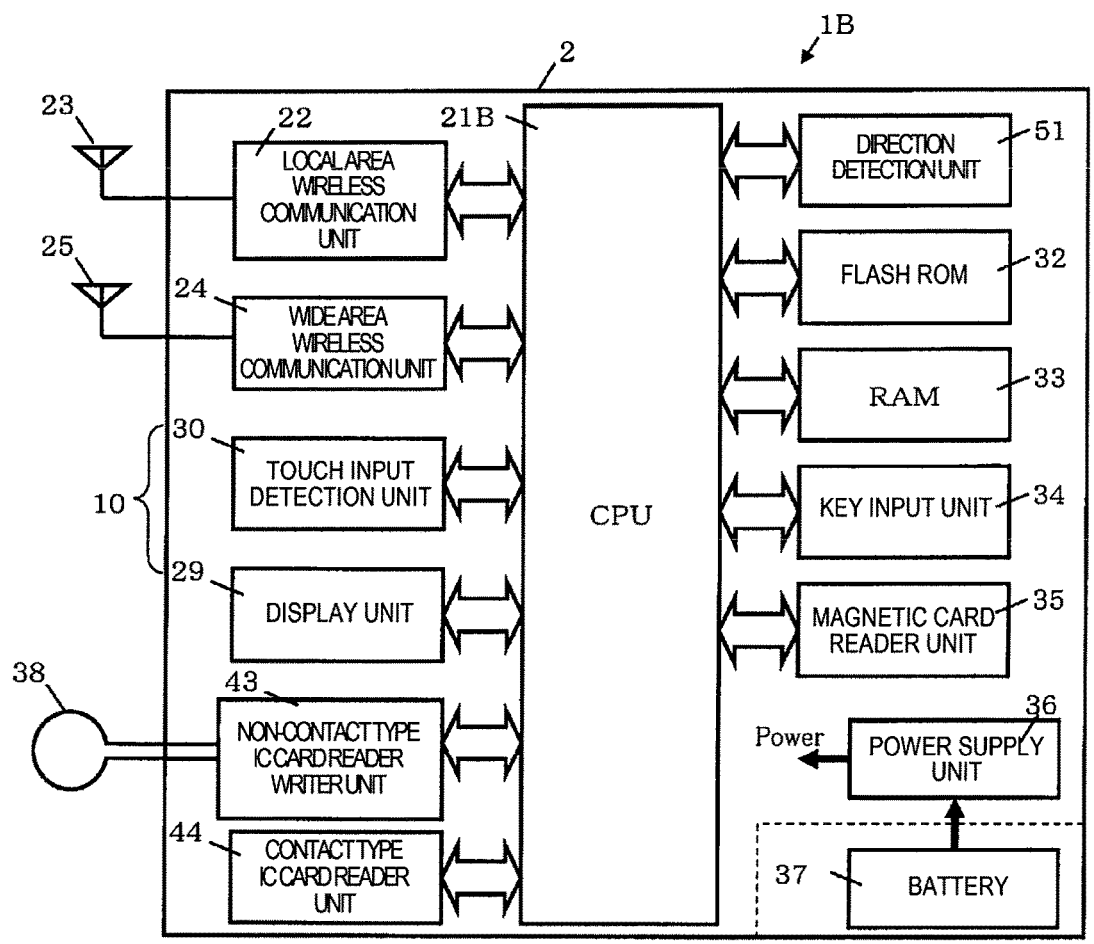
FIG. 8 is a block diagram illustrating a configuration example of a payment settlement terminal device in a second embodiment.

FIG. 8 is a block diagram illustrating a configuration example of payment settlement terminal device 1B. In payment settlement terminal device 1B, the same reference signs will be given to the elements similar to those in payment settlement terminal device 1 illustrated in FIG. 2 and the description thereof will be simplified or will not be repeated.

Comparing with payment settlement terminal device 1, payment settlement terminal device 1B includes direction detection unit 51 and includes CPU 21B instead of CPU 21. Direction detection unit 51 includes, for example, an acceleration sensor and detects the direction of payment settlement terminal device 1B with respect to the direction gravity. CPU 21B controls the detection of the displayed content (for example, the authentication information input field) according to the direction of payment settlement terminal device 1B detected by the direction detection unit 51.

Payment settlement terminal device 1B performs the operations similar to that of payment settlement terminal device 1. The description that overlaps with the description in the first embodiment will not be repeated.

Figure 9A:
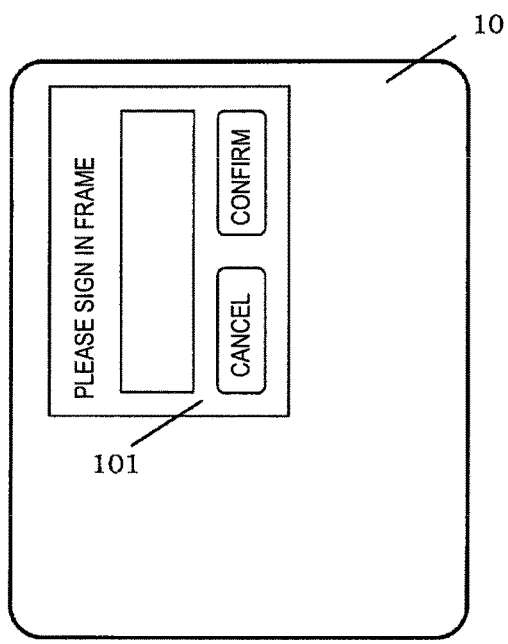
FIG. 9A is a schematic diagram illustrating an example of an arrangement of a signature input screen in a touch panel in the second embodiment.
Figure 9B:
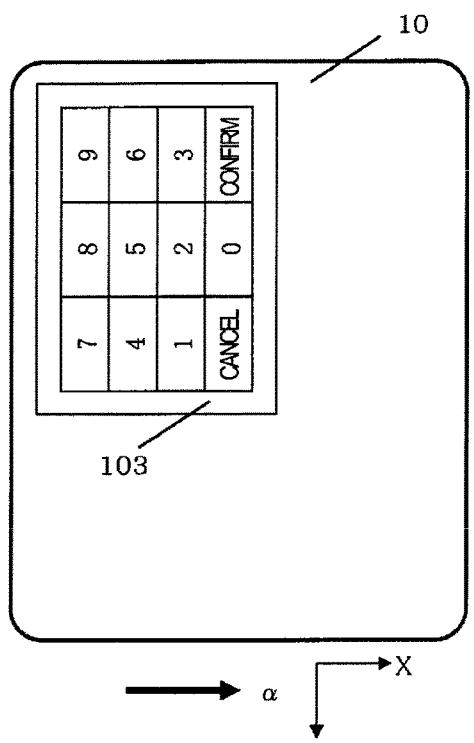
FIG. 9B is a schematic diagram illustrating an example of an arrangement of a PIN input screen in the touch panel in the second embodiment.
Figure 9C:
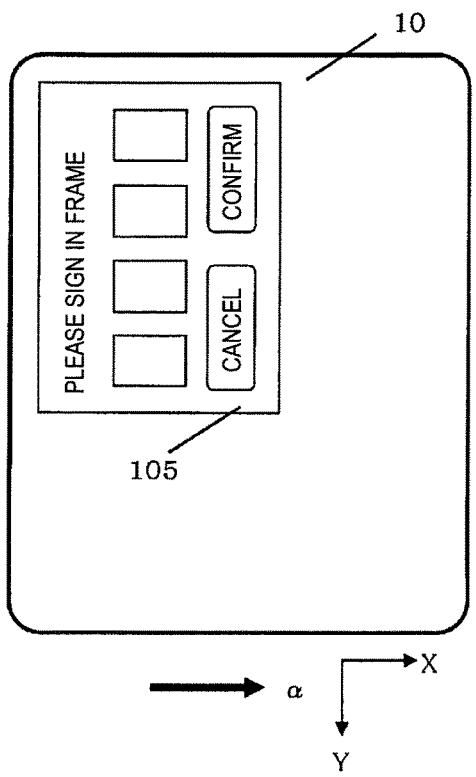
FIG. 9C is a schematic diagram illustrating an example of an arrangement of the PIN input screen in the touch panel in the second embodiment.
Figure 9D:
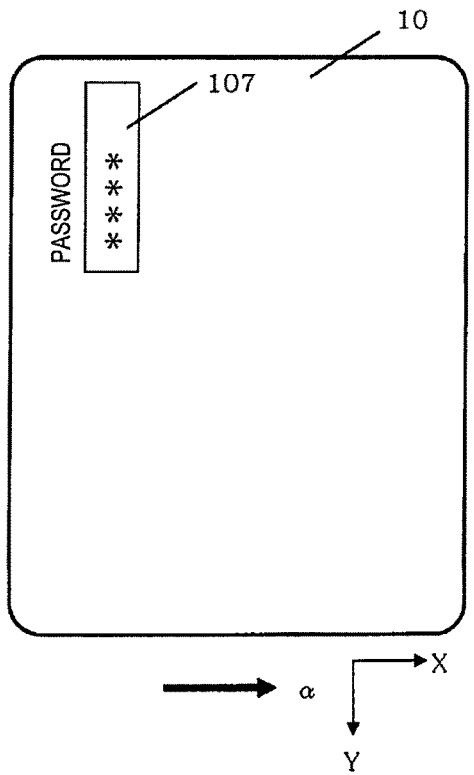
FIG. 9D is a schematic diagram illustrating an example of an arrangement of a PIN input check screen in the touch panel in the second embodiment.

FIG. 9A is a schematic diagram illustrating an example of an arrangement of signature input screen 101 in touch panel 10. FIG. 9B is a schematic diagram illustrating an example of an arrangement of PIN input screen 103 in touch panel 10. FIG. 9C is a schematic diagram illustrating an example of an arrangement of PIN input screen 105 in touch panel 10 in the second embodiment. FIG. 9D is a schematic diagram illustrating an example of an arrangement of PIN input check screen 107 in touch panel 10. In FIG. 9A to FIG. 9D, the direction of gravity is illustrated by an arrow α.

FIG. 9A to FIG. 9D illustrate the examples of the arrangement of each of the screens on the negative end portion in the X axis direction and the negative end portion in the Y axis direction (that is, left upper end portion) in touch panel 10. However, the screens may be arranged on other positions. CPU 21B determines the direction of each screen with respect to touch panel 10 according to direction of gravity α. In FIG. 9A to FIG. 9D, direction of gravity a and the lower side (lower side of the character) of the displayed content of each screen coincide each other. The determination of the direction of each screen by CPU 21B is performed before, for example, step S106 or S112 in FIG. 3.

According to payment settlement terminal device 1B, for example, even in a case where payment settlement terminal device 1B rotates, the input-related screen can easily be checked. For example, in a case where there exists a plurality of users (for example, a clerk and a customer) of the payment settlement terminal device, in the situation of passing payment settlement terminal device 1B or passing the purchased goods, sometimes the authentication information is input in a state where payment settlement terminal device 1B is in various directions. Even in such a case, the authentication information can easily be input or checked.

Lastly, the embodiments are not limited to the configurations in the embodiments described above, and the embodiments can be applied to any configurations as long as the functions expressed in claims attached hereto or the functions of the configurations of the present embodiments can be achieved.

For example, in the example in the embodiment described above, payment settlement terminal device 1 and 1B include one information processing unit 2, but may include a plurality of information processing units. In addition, at least a part of the plurality of information processing units may be secure information processing units.

Furthermore, in the secure information processing unit, in a case where the position of the input-related screen in touch panel 10 is not fixed is applied, the security can be further improved.

For example, in the example in the embodiment described above, the authentication processing is performed at the time when the payment settlement processing is performed. However, the authentication processing can be applied to a case where authentication processing is performed together with another processing or to a case where only the authentication processing is performed.

SUMMARY OF AN ASPECT OF THE PRESENT INVENTION

The information processing device in an aspect of the present invention includes: a display unit that displays an input area in which authentication information which is used for authentication processing is input; a detection unit that detects an input of the authentication information in the input area; and a control unit that changes a display position of the input area with respect to the display unit for each timing in which the detection unit detects. The control unit causes the input area to be displayed on the changed display position with respect to the display unit.

According to this configuration, the position of the input area with respect to the display unit is not fixed in the predetermined position, and moves on a floating basis. Therefore, for example, since it is difficult for the input-related screen to be hidden from the screen due to an unauthorized application, the security in authentication processing can be improved. Furthermore, since it is known in advance that the position of the input-related screen is changed, it is possible to suppress an intention of an illegal action against the input-related screen by a malicious operator.

In the information processing device in an aspect of the present invention, the detection unit detects the transition of the screen which does not include the input area to the screen which includes the input area, and in a case where the transition of the screen is detected by the detection unit, the control unit changes the display position of the input area with respect to the display unit.

According to this configuration, since the display position of the input area is different for each time the input area appears with respect to the display unit, it is possible to improve the security in the authentication processing.

The information processing device in an aspect of the present invention further includes a processing unit that executes the payment settlement processing. In a case where the payment settlement processing is executed by the processing unit, the control unit changes the display position of the input area with respect to the display unit. That is, the control unit, for example, changes the display position of the input area with respect to the display unit to the position different from that in the previous payment settlement processing.

According to this configuration, since the display position is different for each time when the payment settlement processing is executed, it is possible to improve the security in the authentication processing.

In the information processing device in an aspect of the present invention, the detection unit detects the fact that at least a part of the authentication information is deleted from the input area, and in a case where the fact that at least a part of the authentication information is deleted from the input area is detected by the detection unit, the control unit changes the display position of the input area with respect to the display unit. For example, the control unit may change the display position of the PIN input when the number of received digits of the input PIN decreases due to the operation of the cancellation key by the user of the card.

According to this configuration, since the display position of the input area is different for each time when at least a part of the authentication information that has been already input is deleted, it is possible to improve the security in the authentication processing.

In the information processing device in an aspect of the present invention, the detection unit detects the transition of the display by the display unit, and in a case where the transition of the display by the display unit is detected, the control unit changes the display position of the input area with respect to the display unit. For example, the control unit may change the position of the display of the predetermined information (for example, asterisk "*") indicating the received number of digits for each change of the received (stored) number of digits of the PIN input. Alternatively, the control unit may change the display state of the handwriting field for the number (or field for the character) for each digit of handwriting input of the PIN to make the display position in each display state become different from each other. That is, the control unit may make the following display positions be different from each other: the display position of the handwriting itself of the handwritten number (or the character); the display position of the recognition result thereof; and the display position of the predetermined information (for example, the asterisk "*") for indicating only the number of input (stored) received digits.

According to this configuration, since the display position of the input area is different for each time when the display of the display unit shifts, it is possible to improve the security in the authentication processing.

The information processing device in an aspect of the present invention further includes the direction detection unit that detects the direction of the information processing device with respect to the direction of gravity, and the control unit designates the direction of the input area with respect to the display unit according to the direction detected by the direction detection unit.

According to this configuration, for example, even in a case where the information processing device information is passed between the clerk as the user of the information processing device and the customer, and thus, the information processing device is rotated, it is possible to easily check the input area.

The information processing device in an aspect of the present invention further includes a generation unit that generates the input check information for checking the input based on the input of the authentication information detected by the detection unit. The display unit displays the input check area in which the input check information is displayed, and the control unit changes the display position of the input check area with respect to the display unit for each timing when the input check information is generated by the generation unit and causes the input check area to be displayed on the changed display position with respect to the display unit.

According to this configuration, since the position of the input check area is changed, it becomes difficult for the input check area to be hidden by the unauthorized application, and it is possible for the user to correctly input the authentication information.

An information processing method in an aspect of the present invention is an information processing method in the information processing device, and the method includes: detecting an input of the authentication information in the input area in which the authentication information which is used for authentication processing is input; changing a display position of the input area in a display unit that displays the input area, for each timing in which the detection unit detects the input of the authentication information in the input area; a first screen which does not include the input area is shifted to a second screen which includes the input area; and causing the input area to be displayed on the changed display position in the display unit.

According to this method, the position of the input area with respect to the display unit is not fixed in the predetermined position, and moves on a floating basis. Therefore, for example, since it is difficult for the input-related screen to be hidden from the screen due to an unauthorized application, the security in authentication processing can be improved. In addition, since it is known in advance that the position of the input-related screen is changed, it is possible to suppress an intention of an illegal action against the input-related screen by a malicious operator.

An information processing program in an aspect of the present invention is an information processing program that causes each processing in the information processing method to be executed.

According to this configuration, the position of the input area with respect to the display unit is not fixed in the predetermined position, and moves on a floating basis. Therefore, for example, since it is difficult for the input area to be hidden from the screen due to an unauthorized application, the security in authentication processing can be improved. In addition, since it is known in advance that the position of the input area is changed, it is possible to suppress an intention of an illegal action against the input-related screen by a malicious operator.

A recording medium in an aspect of the present invention is a computer-readable recording medium in which the information processing program is recorded.

According to this configuration, the position of the input area with respect to the display unit is not fixed in the predetermined position, and moves on a floating basis. Therefore, for example, since it is difficult for the input area to be hidden from the screen due to an unauthorized application, the security in authentication processing can be improved. In addition, since it is known in advance that the position of the input area is changed, it is possible to suppress an intention of an illegal action against the input-related screen by a malicious operator.

What is claimed is:

1. An information processing device, comprising:
   a display;
   a detector that detects an input for authentication processing in an input area in which authentication information is input, the input area including a predetermined number of input fields used for the authentication processing;
a processor; and
a memory including instructions that, when executed by the processor, cause the processor to perform operations including:
displaying, on the display, a first screen which does not include the input area in which the authentication information is input;
displaying, on the display and after displaying of the first screen, a second screen which includes the input area in which the authentication information is input;
changing for each transition from the first screen to the second screen a display position of the input area;
detecting, by the detector, an input of the authentication information in one of the input fields, and
changing, on the second screen, the display position of the input area based on an increase or a decrease of a number of inputs to the input fields of the input area.

2. The information processing device of claim 1, the operations further including:
detecting, by the detector, the transition to the second screen which includes the input area; and
changing, in a case where the transition to the second screen is detected, the display position of the input area.

3. The information processing device of claim 1, the operations further including:
executing payment settlement processing; and
changing, in a case where the payment settlement processing is executed, the display position of the input area.

4. The information processing device of claim 1, the operations further including:
detecting deletion of at least a part of the authentication information from the input area; and
changing, in a case where at least the part of the authentication information is deleted, the display position of the input area.

5. The information processing device of claim 1, the operations further including:
detecting a transition of the display; and
changing, in a case where the transition of the display is detected, the display position of the input area.

6. The information processing device of claim 1, the operations further including:
displaying, on a third screen, a symbol display area, the symbol display area including a number of input fields equal to the predetermined number of input fields of the input area; and
changing, on the display, the display position of the input area on the second screen and a display position of the symbol display area on the third screen based on the increase or the decrease of the number of inputs to the input fields of the input area.

7. The information processing device of claim 6, the operations further including:
alternately displaying, on the display, the second screen including the input area and the third screen including the symbol display area.

8. The information processing device of claim 1, wherein
the touch panel detects a direction of the information processing device with respect to gravity, and
the operations further include:
detecting, by the touch panel, the direction of the information processing device with respect to gravity; and
controlling, on the second screen, an orientation of the input area according to the direction detected by the touch panel.

9. The information processing device of claim 1, wherein
the input area includes a plurality of input keys, relative positions of the plurality of input keys being same while the display position of the input area on the second screen is changed.

10. The information processing device of claim 1, wherein
the input area includes a touch input area and display area, relative positions of the touch input area and the display area being same with respect to a frame of the input area while the display position of the input area on the second screen is changed.

11. The information processing device of claim 10, wherein
the input area further includes a confirm button, a relative position of the confirm button being same with respect to the frame of the input area, the touch input area, and the display area while the display position of the input area on the second screen is changed.

12. The information processing device of claim 10, wherein
the input area further includes a cancel button, a relative position of the cancel button being same with respect to the frame of the input area, the touch input area, and the display area while the display position of the input area on the second screen is changed.

13. The information processing device of claim 1, wherein
the input area includes a plurality of touch input areas and a display area, relative positions of the plurality of touch input areas and the display area being same while the display position of the input area on the second screen is changed.

14. The information processing device of claim 13, wherein
the input area further includes a confirm button, a relative position of the confirm button being same with respect to a frame of the input area, the plurality of touch input areas, and the display area while the display position of the input area on the second screen is changed.

15. The information processing device of claim 13, wherein
the input area further includes a cancel button, a relative position of the cancel button being same with respect to a frame of the input area, the plurality of touch input areas, and the display area while the display position of the input area on the second screen is changed.

16. The information processing device of claim 1, wherein the detector comprises a touch panel display.

17. An information processing method for an information processing device, the information processing device including a touch panel, the touch panel including a display, the information processing method comprising:
displaying, on the display, a first screen which does not include an input area in which authentication information is input;
displaying, on the display and after the displaying of the first screen, a second screen for authentication processing which includes the input area in which the authentication information is input, the input area including a predetermined number of input fields;

changing for each transition from the first screen to the second screen a display position of the input area;

detecting, by the touch panel, an input of the authentication information in one of the input fields of the input area;

determining, by the information processing device, an increase or decrease of a number of inputs to the input fields of the input area; and changing, by the information processing device and on the second screen, the display position of the input area based on the determining.

* * * * *